US006836766B1

United States Patent
Gilpin et al.

(10) Patent No.: US 6,836,766 B1
(45) Date of Patent: Dec. 28, 2004

(54) RULE BASED CONFIGURATION ENGINE FOR A DATABASE

(75) Inventors: Kevin E. Gilpin, Austin, TX (US); Adam R. Stein, Mountain View, CA (US)

(73) Assignee: Trilogy Development Group, Inc., Austin, TX (US)

( * ) Notice: Subject to any disclaimer, the term of this patent is extended or adjusted under 35 U.S.C. 154(b) by 544 days.

(21) Appl. No.: 09/773,101

(22) Filed: Jan. 31, 2001

(51) Int. Cl.[7] .................................................. G06N 5/02
(52) U.S. Cl. ............................. 706/1; 706/46; 703/19
(58) Field of Search ..................... 706/45, 46; 709/317; 703/19

(56) References Cited

U.S. PATENT DOCUMENTS 5,452,239 A * 9/1995 Dai et al. ..................... 703/19
5,603,031 A * 2/1997 White et al. ................. 709/317
5,809,212 A * 9/1998 Shasha ......................... 706/46

* cited by examiner

Primary Examiner—Wilbert L. Starks, Jr.
(74) Attorney, Agent, or Firm—Hamilton & Terrile, LLP; Kent B. Chambers (57) ABSTRACT

The invention provides the ability to test rules in a rule-based system for configuring a product. The configuration system defines the components of a product using elements contained in a parts catalog and rules that define relationships between the components of a product. The user provides test cases that select at least one part to include in the product configuration, and the configuration tester processes the rule to determine whether the at least one part selected in the test case conflicts with the plurality of parts previously included in the product configuration.

71 Claims, 7 Drawing Sheets

RULE BASED CONFIGURATION ENGINE FOR A DATABASE

BACKGROUND OF THE INVENTION

1. Field of the Invention

This invention relates generally to computerized configuring systems. More specifically, this invention relates to a system and method for testing the compatibility of parts included in a configuration.

2. Description of the Related Art

Many products are comprised of individual parts or components. Currently, configuring systems, also referred to as configuration engines, are available that allow a user to configure a product by interactively selecting components from among various groups based on availability and compatibility of features and options for the product. One known system is described in U.S. Pat. No. 5,825,651, entitled "Method and Apparatus For Maintaining and Configuring Systems," issued Oct. 20, 1998, (hereinafter the "'651 patent"), which is assigned to the same assignee as the present invention, and is hereby incorporated by reference.

In one embodiment of a configuration system disclosed in the '651 patent, a framework for defining a product line includes a set of related components that are selected from a parts catalog. A product might consist of several hundred individual parts that are organized into part groups and are available on one or more of a number of products. A product is modeled by describing which parts and part groups are available in that product and which choices must be made from within the part groups, and then by writing additional rules that describe part-to-part relationships which are not modeled by the product structure. A compiler converts the product structure and the rules into four rule types: includes (parts that are included by default), excludes, removes, and requires choice (a choice among a group of parts that must be made to achieve a valid configuration). Parts may also be classified as optional which signifies that they can be optionally included in the configuration.

After compilation, there may be several hundred, several thousand, or even more of these rules. When the system loads the model, all parts and products should initially be in a "selectable" state, which means that the client or user is allowed to choose them. When the client selects a part, that part is put in the "selected" state. Parts that are included by the selected parts enter the "included" state, and parts that are excluded by the selected parts enter the "excluded" state. Parts that were previously included but are removed by a "removes" rule are in the "deleted" state. Each part must always be in exactly one state. Parts that are selected by a user or are included are referred to as "selected". Parts that are excluded or deleted are referred to as "not selectable".

As product models grow in size and complexity, configuration errors may occur when a rule or series of rules is not properly defined and produces an undesired effect, such as the exclusion of a part that should be selectable. Configuration errors may also occur when a series of improperly defined rules causes a part to be in more than one state at the same time, such as "included" and "excluded", or "selected" and "deleted".

For large models, such errors may be difficult to find due to the large number of rules in the model, the unexpected effects of some configuration operations, and the complex interactions between rules. It is therefore desirable to have an automated testing tool to locate and analyze configuration errors, so that the rules may be corrected.

SUMMARY

The invention provides in one embodiment the ability to test rules in a rule-based system for configuring a product. A configuration system defines the components of a product using elements contained in a parts catalog and rules that define relationships between the components of a product. The user provides test cases that select at least one part to include in the product configuration, and the configuration tester processes the rule to determine whether the at least one part selected in the test case conflicts with the plurality of parts previously included in the product configuration.

In one embodiment, the invention provides a method of testing a product configuration in a system for generating product configurations that include a variety of component parts. The configuration system includes one or more rules that define a relationship between at least two parts. The method includes entering a test case that selects at least one part to include in the product configuration. The system then processes the rule to determine whether part selected in the test case conflicts with parts that are already included in the product configuration, that is, whether the rule conflicts with other rules.

To test new rules, one embodiment of the invention initializes the configuration system with a part state and inputs at least one part selection as specified in the test case. A component referred to as a "listener" detects state change events that result in the system being in the initialized part state. Another component of the invention generates a cause that explains the part state in terns of the state change event, and generates a new part state for each part associated with the cause. The invention then determines the cause or causes that explain the new part states in terms of the state change event.

One feature of an embodiment of the invention generates a cause tree wherein the root of the cause tree is the initial part state, and "leaves" of the tree are the user's selections of parts.

Another component of an embodiment of the invention is an "explainer" which generates an explanation of the part state wherein the part selections are the root of the explanation and the causes follow from the part selections. The explanation(s) are based on selection of a part, execution of a rule, a part being in two states at the same time, a requires choice rule that cannot be satisfied, or on a look ahead process. To provide an explanation of how the system arrived at a particular part state, the invention sorts the tree by iteration number, wherein the iteration number of a part state is determined by measuring the longest distance between the part state and the cause corresponding to the part state.

In another embodiment, the invention is distributed as an article of manufacture, namely a computer usable medium having computer readable program code embodied therein for testing a product configuration in a system for generating product configurations. The system includes at least one rule defining a relationship between at least two parts, and the product configuration includes a plurality of parts.

The computer readable program code is configured to cause a computer to allow a user to enter a test case, wherein the test case selects at least one part to include in the product configuration. The program code then causes a computer to process the at least one rule to determine whether the at least one part selected in the test case conflicts with the plurality of parts previously included in the product configuration. This is accomplished by the computer readable program code causing a computer to initialize the system with a part state, to input the part selection to the system; and to listen to state change events in the system to detect when a state change event occurs that results in the system being in the initialized part state.

The program code then causes a computer system to determine the cause or causes that explain the new part states in terms of the state change event.

One feature of the program code causes a computer to generate a cause tree wherein the root of the cause tree is the initial part state, and "leaves" of the tree are the user's selections of parts.

Another component of the program code causes a computer to execute a component referred to as an "explainer" which generates an explanation of the part state wherein the part selections are the root of the explanation and the causes follow from the part selections. The explanation(s) are based on selection of a part, execution of a rule, a part being in two states at the same time, a requires choice rule that cannot be satisfied, or on a look ahead process. To provide an explanation of how the system arrived at a particular part state, the invention sorts the tree by iteration number, wherein the iteration number of a part state is determined by measuring the longest distance between the part state and the cause corresponding to the part state.

The foregoing has outlined rather broadly the objects, features, and technical advantages of the present invention so that the detailed description of the invention that follows may be better understood.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

Figure 1:
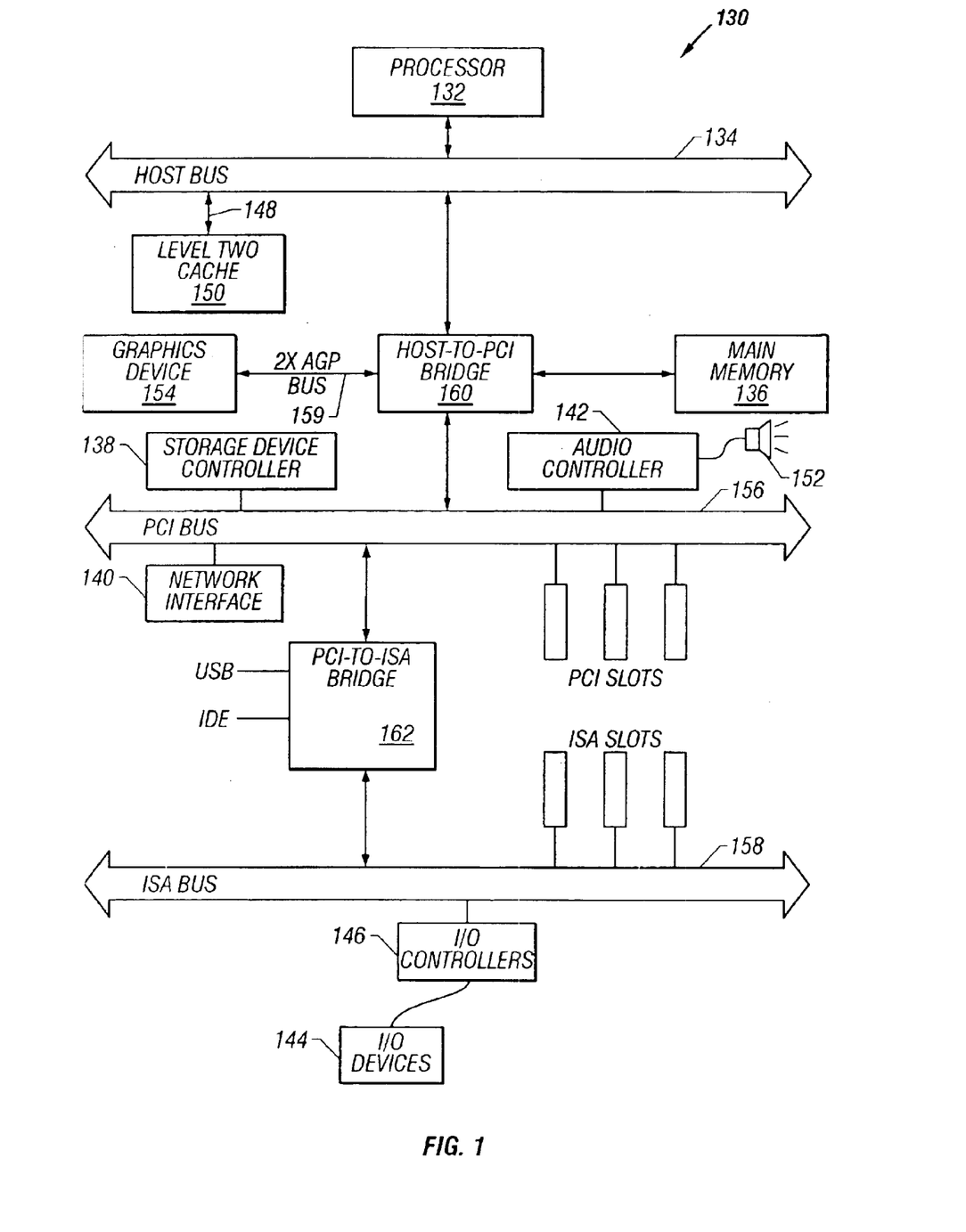
FIG. 1 is a block diagram of a computer system with which the present invention may be utilized.

A method and apparatus for testing a system for maintaining and configuring products is described. The present invention can be implemented on a general purpose computer system 130 such as illustrated in FIG. 1. Computer system 130 may be one of many workstations or servers connected to a network such as a local area network (LAN), a wide area network (WAN), or a global information network such as the Internet through network interface 140.

CPU 132 can be constructed from one or more microprocessors and/or integrated circuits. Main memory 136 stores programs and data that CPU 132 may access. When computer system 130 starts up, an operating system program is loaded into main memory 136. The operating system manages the resources of computer system 130, such as CPU 132, audio controller 142, storage device controller 138, network interface 140, I/O controllers 146, and host bus 134. The operating system reads one or more configuration files to determine the hardware and software resources connected to computer system 130.

During operation, main memory 136 includes the operating system, configuration file, and one or more application programs with related program data. Application programs can run with program data as input, and output their results as program data in main memory 136 or to one or more mass storage devices through a memory controller (not shown) and storage device controller 138. CPU 132 executes one or more application programs, including one or more programs to establish a connection to a computer network through network interface 140. The application programs may be embodied in one executable module or may be a collection of routines that are executed as required. Operating systems commonly generate "windows", as well known in the art, to present information about or from an application program, and/or to allow a user to interact with an application program. Each application program typically has its own window that is generated when the application program is executing. Each window may be minimized to an icon, maximized to fill the display, overlaid in front of other windows, and underlaid behind other windows.

Storage device controller 138 allows computer system 130 to retrieve and store data from mass storage devices such as magnetic disks (hard disks, diskettes), and optical disks (DVD and CD-ROM). The information from the DASD can be in many forms including application programs and program data. Data retrieved through storage device controller 138 is usually placed in main memory 136 where CPU 132 can process it.

One skilled in the art will recognize that the foregoing components and devices are used as examples for sake of conceptual clarity and that various configuration modifications are common. For example, audio controller 142 is connected to PCI bus 156 in FIG. 1a, but may be connected to the ISA bus 138 or reside on the motherboard (not shown) in alternative embodiments. As further example, although computer system 130 is shown to contain only a single main CPU 132 and a single system bus 134, those skilled in the art will appreciate that the present invention may be practiced using a computer system that has multiple CPUs 132 and/or multiple busses 134. In addition, the interfaces that are used in the preferred embodiment may include separate, fully programmed microprocessors that are used to off-load computationally intensive processing from CPU 132, or may include input/output (I/O) adapters to perform similar functions. Further, PCI bus 156 is used as all exemplar of any input-output devices attached to ally I/O bus; AGP bus 159 is used as an exemplar of any graphics bus; graphics device 154 is used as an exemplar of any graphics controller; and host-to-PCI bridge 160 and PCI-to-ISA bridge 162 are used as exemplars of any type of bridge. Consequently, as used herein the specific exemplars set forth in FIG. 1 are intended to be representative of their more general classes. In general, use of any specific exemplar herein is also intended to be representative of its class and the non-inclusion of such specific devices in the foregoing list should not be taken as indicating that limitation is desired.

The invention detects and analyzes configuration errors in a system for configuring products such as described in the '651 patent. A brief description of the '651 patent is provided in the following paragraphs as background for understanding the present invention.

Brief Description of the '651 Patent

Figure 2:
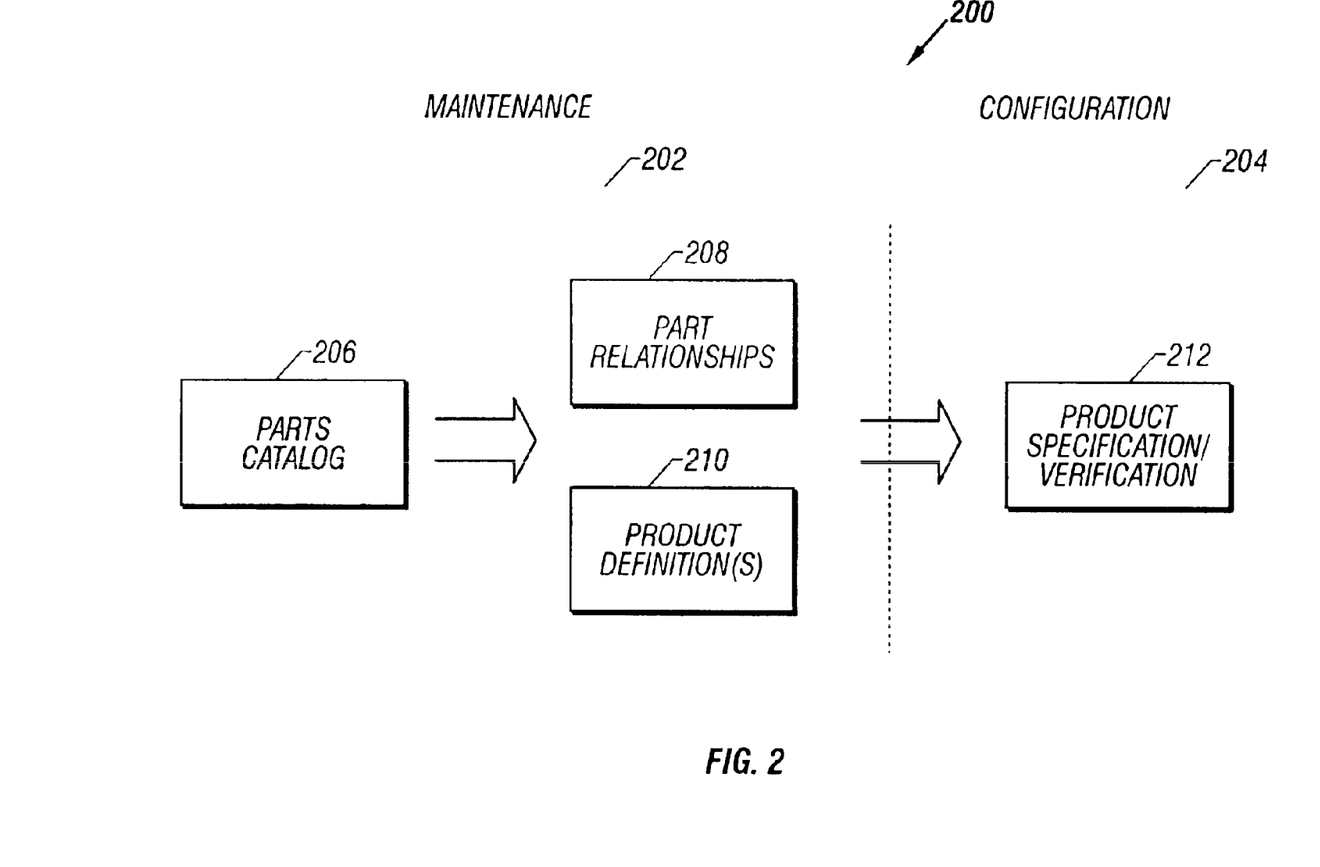
FIG. 2 is a block diagram of an embodiment of a maintenance and configuration system with which the present invention may be utilized.

Referring to FIG. 2, one embodiment of configuration engine 200 disclosed in the '651 patent is shown Configuration engine 200 is rule-based, and includes maintenance environment 202 and configuration environment 204. Maintenance environment 202 includes zero or more individual parts, or components, in parts catalog 206. Part relationships 208 defines relationships between a first set of parts and a second set of parts so that when all of the members of the first set of parts are selected, the relationship between the two sets is enforced on the parts in the second set. A set of parts can include multiple parts. The incorporation of parts in a set can be arbitrary. That is, a multi-part set can contain parts that are otherwise unrelated. For example, for the purpose of configuring an automobile, a set can contain parts such as an engine, sun roof, and a color. These parts seem to be unrelated, but they can be combined into a part relationship 208 for purposes of forming a relationship using an embodiment of configuration engine 200.

In one embodiment there are four kinds of part relationships 208 between parts: requires choice, includes, excluded, and removes. An included part is included automatically. A part is excluded from the configuration when its inclusion would result in an invalid configuration. A part may be removed when another part is added. Thus, when a first part exists in the configuration and a second part is added, the first part is removed from the configuration if there is a conflict. The requires choice relationship is used to allow a set of choices to be made from a group of parts. The number of parts chosen is limited to a valid bounds specification. The relations that are created between parts within a product are enforced only on that particular product. However, if some part relationships 208 are to be enforced on all products within a product line, then the relations are generated once and enforced for all products.

One or more product definitions 210 are generated by a population of component parts. Using configuration engine 200, a user can configure a product given product definitions 210 and part relationships 208 associated with product definitions 210. Configuration environment 204 accepts a configuration user's input and processes it in product specification/verification 212 to verify the product configuration, and to update the specification based on the user's input, or to notify the user that the input is invalid based on product definitions 210 and user selections.

A graphical user interface (GUI) is used to allow the user to interactively generate product definitions 210. GUI operations such as drag, drop, and selection operations can be used to specify product definitions 210.

Relationships associated with items contained in product definitions 210 are evaluated when user input is received. Configuration engine 200 determines which relationships are active and inactive given the user input. A relationship is active when all the items in a product's product definition 210 are selected. A relationship is inactive until all of the parts in a product's product definition 210 are selected.

Configuration engine 200 is used to configure a product using a definition created by the maintenance environment 202. Configuration environment 204 ensures that the current configuration state is always valid. The user can select and unselect parts in any order. When user input is received, product specification/verification 212 validates the input based on the current state of the configuration. In addition, the product specification/verification 212 identifies selections that could cause a valid configuration to become invalid. Product specification/verification 212 removes these selections from the set of possible selections so that the user does not make an invalid selection.

Configuration engine 204 evaluates the current state of a configuration based on product definitions 210, part relationships 208, and state information. After receipt of input from a user, product specification/verification 212 evaluates relationships in both the forward and backward direction. Forward and backward evaluations can result in the addition or deletion of elements from the product configuration.

During configuration, information is stored in tables and vectors. Configuration engine 200 represents elements in a configuration (e.g., product, part, and group) as bits in a bit vector. Thus, for example, a vector includes a number of bits is equal to the total number of elements. An element's bit can be set or reset to specify the state of the element in the current configuration. For example, a user vector can be used that specifies for each element whether the element has been selected by the user during the configuration. In addition, excluded and removed vectors identify whether an element is excluded or removed (respectively) from a configuration. Vectors can be used to identify whether an element 1) has been selected (by the user or the configuration system), 2) is selectable, and 3) not selectable.

Tables contain element relationships. A table is used to represent the includes, excludes, removes, and requires choice relationships, for example. Each table has a left-hand side and a right-hand side that corresponds to the left-hand and right-hand sides of a relationship. In each case, the left-hand side is a bit vector that contains bits corresponding to elements. The includes, excludes and removes tables contain a bit vector in the right-hand side that represents configuration elements. The right-hand side of the requires choice table is a pointer that points to an entry in a group table. The group table entry is a bit vector that identifies the elements that are contained in the group from which a choice is to be made. The right-hand side of a requires choice table entry further includes minimum and maximum designations. Minimum and maximum values identify the minimum and maximum number of group members that are to be selected to satisfy a requires group relationship.

The bit vector implementation of relationships and internal runtime state allows for fast and efficient computation of relationship-based configuration. A comparison of bits can be performed in one machine instruction in most cases.

There are many ways that errors can be introduced into a configuration, however, the effects of these errors can be categorized in 2 groups:

1) A part is put in a state which was not intended by the user (state error), or 2) A part is put in more than one state at the same time (exception error).

Errors may be caused by a single rule, or by a chain of rules. Complex errors are often caused by a "look ahead" process included in product specification/verification 212 that test-selects each product (if more than one product is selectable) to make sure that it is in fact selectable. The look-ahead process helps insure that the state of a product is not reported as selectable when selection of that product would lead to a rule conflict. The look-ahead process also determines the sets of parts that are excluded or deleted by every selectable product.

Further errors may arise with requires choice rules, which typically require that between some minimum (min) and maximum (max) number of choices must be made from a set of parts. For example, there is always an implicit requires choice rule that specifies that at least exactly one (min/max= 1/1) part must be selected for a product. Requires choice rules are complex to evaluate because they may cause many kinds of inferences. In general, there is no way to determine whether a selectable part is actually selectable without selecting it and checking to see whether it causes a conflict. In order to ensure that each selectable part is not going to cause such a conflict, configuration engine 200 would have to select a selectable part after each user selection, which is too computationally expensive. The following examples of each type of error illustrate the problem.

State Errors

The simplest types of state errors are caused when a rule has been accidentally omitted or written. For example, the user may select PartA and PartB, and then note that 'PartC' is excluded rather than selectable. In the simplest case, this may be due to the following rule in the model:

PartA Excludes PartC

Or, there may be a rule:

PartA Requires Choice (min/max=1/1) {PartB, PartC}

Here, selecting PartA implies that either PartB or PartC must be selected. Selecting PartB causes configuration engine 200 to infer that PartC must be Excluded. Alternatively, multiple rules may cause a state change, for example:

PartA Includes PartX PartX Excludes PartC

Here, selecting PartA causes PartX to be included, which then causes PartC to be excluded.

State errors can also be caused by the look-ahead process. Suppose the following rules are written:

ProductA Excludes PartA
ProductB Includes PartB
ProductB, PartB Excludes PartA
ProductC RequiresChoice (min/max=1/1) PartA, PartC
ProductC Includes PartC Even if the user has not made any selections, PartA will be excluded by the look ahead process for each of products A, B, and C. Detecting state changes that are caused by the look-ahead process is particularly difficult because for each product there may be a different rule chain or exception error that causes the state error.

Exception Errors

Sometimes, rules may be inadvertently written that cause a conflicting state exception. The simplest case can be summed up by the rules:

PartA includes PartB
PartB excludes PartA

If PartA is selected, then PartB will be Included. But then the second rule causes PartA to be excluded. This conflicting state cannot be reconciled, and an exception is raised.

Most exception conditions are more complex than this one. For example, selecting a part that is in a requires choice rule may cause the requires choice rule to be unsatisfiable as follows:

PartA requires choice (min/max=1/1) {PartB, Part C}
PartB includes PartC

In the preceding rules, if PartA is selected, selecting PartB will cause an exception error because the requires choice rule will not be satisfiable.

Configuration Testing

Figure 3:
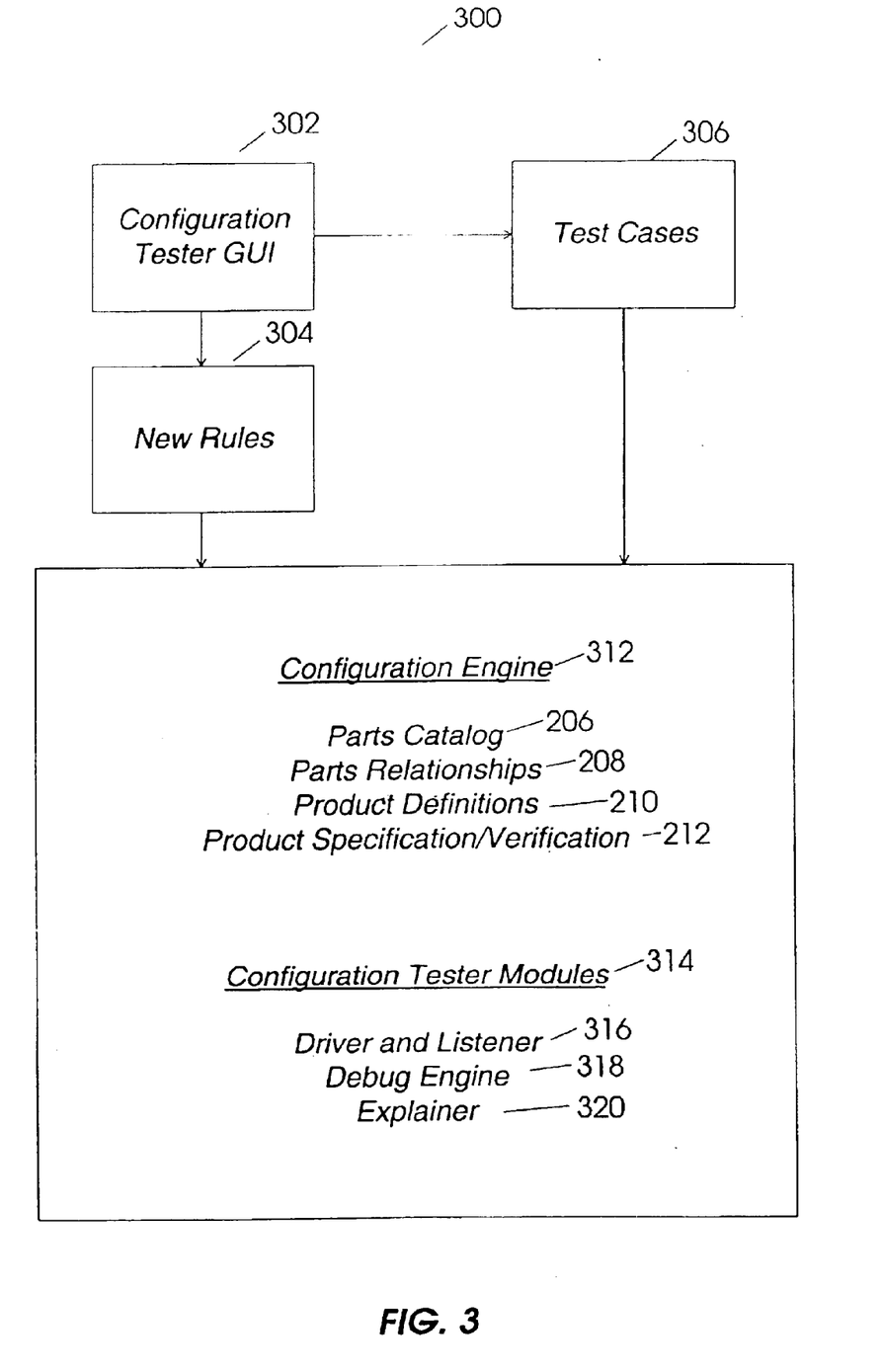
FIG. 3 is a block diagram of a maintenance and configuration tester system according to an embodiment of the present invention.

FIG. 3 shows an embodiment of the present invention for configuration tester system 300 that includes several components for detecting and analyzing configuration errors. One component is configuration tester graphical user interface (CTGUI) 302 that enables users to enter new rules 304 and define test cases 306 that describe the expected behavior of their models to test the configuration. New rules 304 are input to parts relationships 308 and product definitions 310 in configuration engine 312. Test cases 306 describe one or more sets of selections that should be made, and sets of parts and their expected states based on new rules 304, as well as rules previously included in parts relationships 308 and product definitions 310. For example, test cases 306 may describe the selection of a product and several parts. It may then ensure that some other set of parts is excluded, and a third set is included. An example of a test case in test cases 306 is:

Select ProductA
Select PartA
Ensure that (PartB, PartC) are excluded
Ensure that (PartD) is included Once test cases 306 are written, configuration tester modules 314 run each test case 306 and verify that the tested parts are in the right state. If a test fails, configuration tester modules 314 determine why a part is in a certain state and explain the state as described below. The database of pre-existing rules can then be modified to correct errors found by configuration tester modules 314.

Figure 3A:
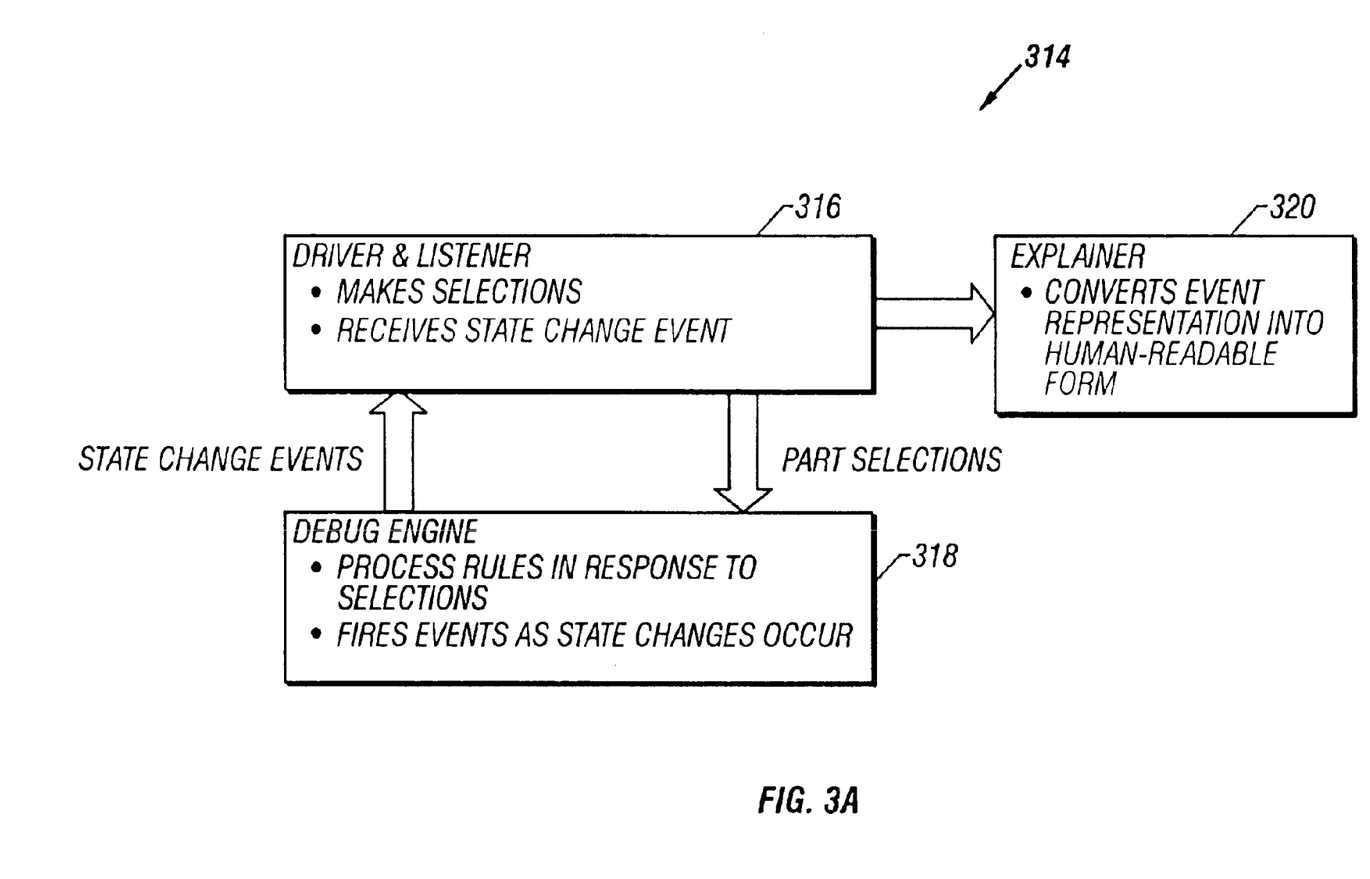
FIG. 3a is a block diagram of configuration tester modules included in an embodiment of the present invention.

Configuration tester modules 314 include driver and listener module 316, debug engine 318, and explainer 320. FIG. 3a shows interrelationships of configuration tester modules 314 including types of data communicated between driver and listener 316, debug engine 318, and explainer 320, during operation. Driver and listener 316 selects parts from test cases 306 and sends the part selections to debug engine 318.

Debug engine 318 processes new rules 304 using the part selections, and sends state change events to driver and listener 316 as state changes result from the rules executing, exceptions occurring, and execution of the look ahead process. In the '651 patent, configuration engine 200 (FIG. 2) is optimized for very high performance. In one embodiment, configuration tester system 300 includes components of configuration engine 200 such as parts catalog 206, parts relationships 208, product definitions 210, and product specification/verification 210. Configuration tester system 300 can run in test mode or normal mode so that no performance penalties are imposed when operating configuration tester system 300 in normal mode. This is accomplished by executing all features and components of configuration tester system 300 from debug engine 318, which is only used in test mode.

The application program interface (API) to debug engine 318 includes program instructions to include new rules 304 with existing rules in parts relationships 208 and product definitions 210, and to run test cases 306 through product specification/verification 210. Debug engine 318 presents the same API as the normal mode of configuration engine 200 for selecting parts. CTGUI 302 is used to specify which test cases to run. Whenever a condition occurs that causes a part state change, debug engine 318 detects this condition and transmits an appropriate notice to driver and listener 316 for the listener portion to handle and interpret the events.

Driver and listener 316 listens to the state change events and constructs a tree of the rule chains that are executing in debug engine 318 and resulting states. When a state error occurs, driver and listener 316 executes a driver to recreate the error condition for the part for which the state error occurred, along with all the part selections that caused the error to occur. The combination of the part and its state is represented by a part state.

In one embodiment, the part-state includes an identifier for the part, the state of the part, the selections which have been made (which are always a subset of the total user selections), and, optionally, the product for which lookahead is currently being run. For example, a part-state may represent:

Part A is included after selecting Part X and Part Y, or

Part B is excluded with no selections during lookahead on Product X.

Each part-state also has a Cause, which is initially null. Configuration tester system 300 determines the Cause of the part state (a rule firing, an exception, a user selection, etc) and sets the Cause of the part-state.

Driver and listener 316 interfaces with debug engine 318. The driver portion of driver and listener 316 starts submitting the part selections that led to the error until a state change event occurs that recreates the error condition. The listener portion of driver and listener 316 is responsible for handling the state change events. It may happen as a result of any of the following:

1) A user selection

2) A rule executing

3) A rule conflict (exception error)

4) Operation of the look ahead process

In each case, the driver generates a cause, which represents the event and the state change that resulted from it. Then, based on this new information, further analysis to explain the part state may be required to explain the error in accordance with the following summary:

| Cause | Explanation Complete? | Next steps |
|---|---|---|
| User Selection | Yes | |
| Rule Executing | No | Determine why the rule executed |
| Conflicting State Exception (part is in 2 states at the same time) | No | Explain each of the conflicting states |
| Unsatisfiable requires choice exception | No | Determine why the requires choice rule executed, and explain the state of the parts that caused it to be unsatisfiable |
| Look ahead process | No | Explain the state of the part in each selectable product |

Driver and listener 316, and debug engine 318, are recursive. The driver portion of driver and listener 316 is initialized with a single part state, along with a set of user selections. The user selections are specified in the test case. The driver inputs each user selection one by one, until the listener gets a state change event that explains the part state. Then the listener generates a cause that explains the part state in terms of the event. The listener also generates a new part state for each part associated with the cause. Then driver and listener 316 start over to find the causes that explain the new part states. Eventually, all part states can be explained in terms of a user selection. The explanation of the original part state is thus represented by a tree of causes and part states. The original part state is the root of the tree. The second level of the tree, i.e., the leaves, consist of the causes that caused the root part state. The next level is the part states that caused the causes, and so on.

For example, in one embodiment, suppose the task is: Explain why A is Included if X and Y are UserSelected. The tree might look like this:

Each PartState points to its Cause. If the Cause is a RuleCause, the Cause points to the parts that caused the rules to fire and their state is in turn explained with Cause objects.

Explainer 320 converts the tree into a format that readily allows the user to visualize the rules that are causing an erroneous result in the configured product. The root of the tree is the initial goal part state, and the leaves of the tree are the user's selections of parts. It is more intuitive to the user, however, to see the part selections as the root of the explanation, and then the chain of causes that follow from these selections. Accordingly, explainer 320 accepts the tree as input, and generates a description of the sequence of events by modeling the logical operation of configuration engine 312, not the literal sequence of actions. This is because converting the tree requires more than post-order traversal, which only provides a trace of the state of configuration engine 312. Logically, configuration engine 312 operates in a series of cause-and-effects iterations. In each iteration, configuration engine 312 first determines which rules should execute, and then applies the results of those rules to the current state of the configuration. The process then repeats until the internal state of the configuration is no longer changing with each iteration. At this point, equilibrium is reached, and configuration engine 312 is ready to once again receive another selection of a part as input.

Figure 3B:
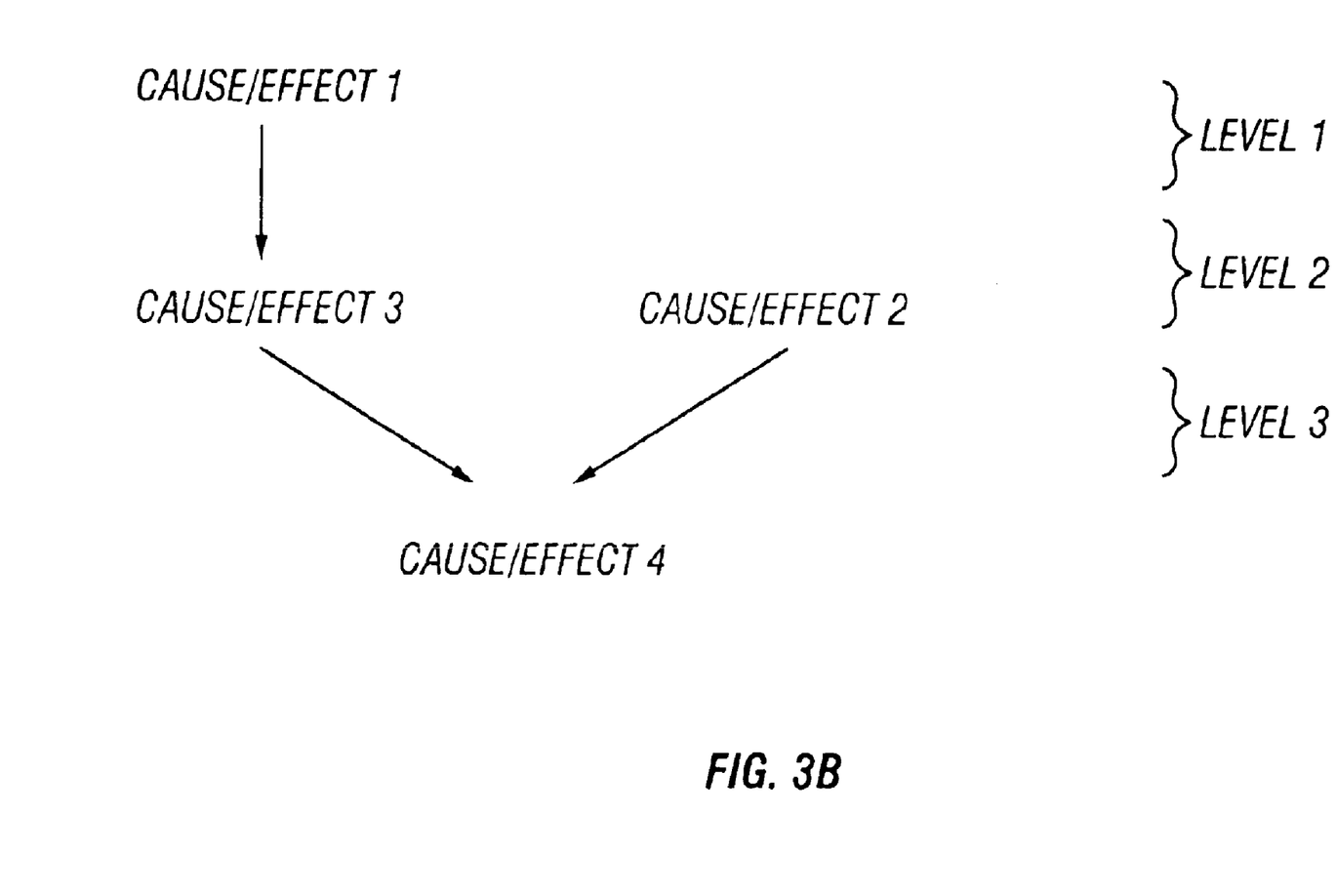
FIG. 3b is a diagram of an example of a cause/effect tree.

Explainer 320 determines the stem for each cause in a given iteration from part states in previous iterations, and determines the cause for each part state in the same iteration. This provides a mechanism for grouping and sorting the tree by iteration. In the simple case, the iteration number of a given part state is determined by measuring the longest distance between a part state and a leaf cause. For any given node in the cause/effect tree, the distances between that node and all the leaves of the tree that connect to that node can be counted. The maximum of this set of values is the maximum depth of the node, which is also the iteration number for that cause/effect. FIG. 3b shows an example of a cause/effect tree where the maximum depth of cause/effect 4 is two (2) (level 3 minus level 1).

Consider, for example, the following set of rules:

1) A includes X

2) B excludes Y

3) A,C,X require Y,Z

And the following sequence of events:

1) User picks A

2) Rule 1 brings in part X

3) User picks B

4) Rule 2 excludes Y

5) User picks C

6) Rule 3 includes Z

There are several things to notice in this example. First, the order of user selections is irrelevant with regard to the logical operation of configuration engine 312 is concerned. Also, the order of execution of rules 1 and 2 is irrelevant. These details are abstracted away when the sequence of events is broken into logical rounds:

Round 1: User selects A, B, C
Round 2: Rule 1 includes X Rule 2 excludes Y
Round 3: Rule 3 includes Z The latter description eases understanding the logical flow of configuration engine 312, and better highlights the dependencies between user actions and rules. This is especially true in situations involving more complex series of rules. For the preceding example, the latter representation makes it immediately clear that the activations of rules 1 and 2 are not causally linked events, whereas the first representation leaves open the possibility that rule 2 executes as a consequence of rule 1.

Complications Caused By Look Ahead

In the look ahead process, configuration engine 312 makes a series of selections to determine what would happen if the user chose particular parts. Many rules can execute within a particular look ahead scenario, but eventually all of these rule executions are retracted, and the results of the look ahead process are applied to the current product being configured. Therefore, an entire look ahead event happens within an individual round of configuration engine 312 activity, even though the look ahead event itself may contain many rounds of executing rules. The recursive aspect of the causes and part states tree is taken into account to invert the causes and part states tree with explainer 320. Essentially, explainer 320 regards look ahead events as branches within the main tree, and collapses them down to single nodes when calculating the proper round in which to place a given cause or part state. An example of what happens during look ahead is: given two products, P1 and P2, and the rules 'P1 excludes A', 'P2 excludes A', Lookahead internally selects each selectable product in turn, and determines whether there are any parts which are excluded by all products. In this example, A would be excluded by lookahead. To the explainer, this can be summarized as 'A is excluded by Lookahead', but within each product, the rules provide a further cause.

Figure 3C:
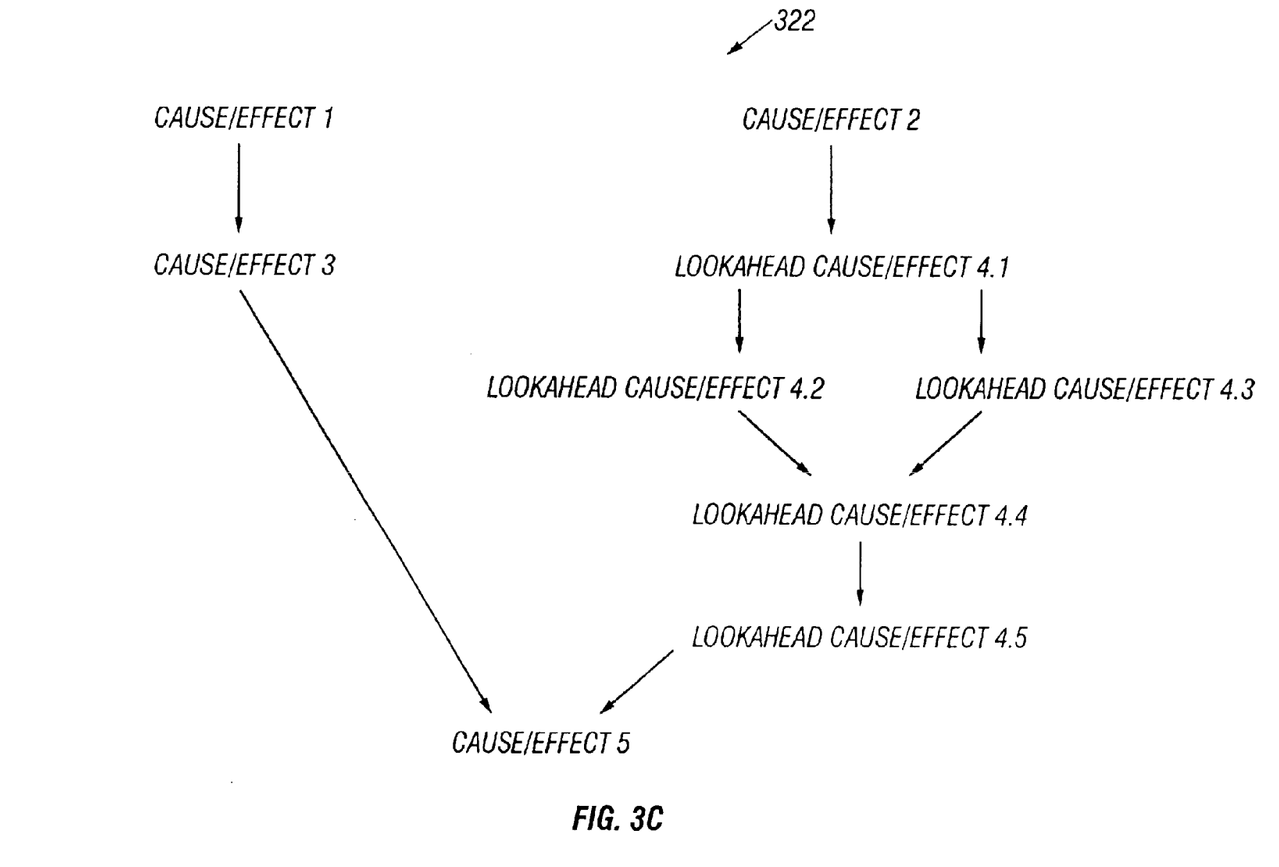
FIG. 3c is a diagram of an example of a lookahead subtree embedded within a cause/effect tree.
Figure 3D:
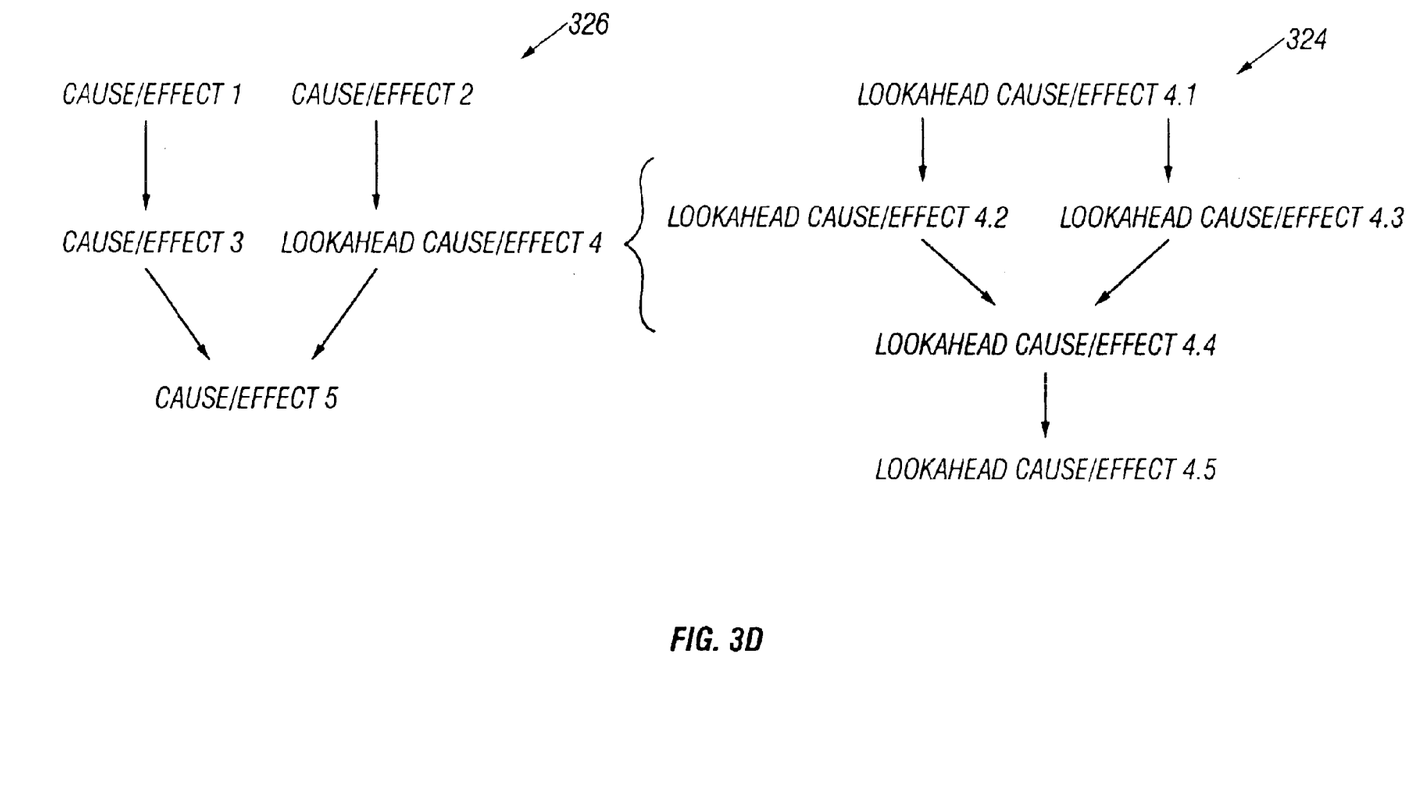
FIG. 3d is a diagram of an example of a lookahead subtree collapsed to a single node in the cause/effect tree.

FIGS. 3c and 3d show how lookahead nodes are collapsed to a single node of the main cause/effect tree. Specifically, FIG. 3c shows lookahead nodes 4.1 though 4.5 expanded within the main cause/effect tree 322, while FIG. 3d shows lookahead subtree 324 collapsed into lookahead cause/effect 4 in main cause/effect tree 326.

In one embodiment, Explainer 320 is designed in an object-oriented fashion that allows key elements of the process to be overridden to provide specialized behavior. For example, some configuration models are generated automatically from known product data descriptions or other sources. Explainer 320 can be overridden to trace explanations all the way back to these original rule sources. Explainer 320 can also be overridden to integrate data from historical logs or databases, as well as data input by the user.

The present invention has been described in the context of a fully functional computer system, however those skilled in the art will appreciate that the present invention is capable of being distributed as a program product in a variety of forms, and that the present invention applies equally regardless of the particular type of signal bearing media used to actually carry out the distribution. Examples of signal bearing media include: recordable type media such as floppy disks and CD-ROM, transmission type media such as digital and analog communications links, as well as media storage and distribution systems developed in the future.

Additionally, the foregoing detailed description has set forth various embodiments of the present invention via the use of block diagrams, flowcharts, and examples. It will be understood by those within the art that each block diagram component, flowchart step, and operations and/or components illustrated by the use of examples can be implemented, individually and/or collectively, by a wide range of hardware, software, firmware, or any combination thereof. In one embodiment, the present invention may be implemented via Application Specific Integrated Circuits (ASICs). However, those skilled in the art will recognize that the embodiments disclosed herein, in whole or in part, can be equivalently implemented in standard integrated circuits, as a computer program running on a computer, as firmware, or as virtually any combination thereof and that designing the circuitry and/or writing the code for the software or firmware would be well within the skill of one of ordinary skill in the art in light of this disclosure.

While the invention has been described with respect to the embodiments and variations set forth above, these embodiments and variations are illustrative and the invention is not to be considered limited in scope to these embodiments and variations. Accordingly, various other embodiments and modifications and improvements not described herein may be within the spirit and scope of the present invention, as defined by the following claims.

What is claimed is:

1. A method of using a computer system to test a product configuration for configuration errors, wherein the product configuration is stored as electronic data in a computer system for generating product configurations, the computer system including at least one rule defining a relationship between at least two parts, the product configuration including a plurality of parts, the method comprising:

entering a test case into the computer system to detect configuration errors in the product configuration, wherein the test case includes data to change the product configuration;

processing the test case with the computer system in accordance with the at least one rule to detect whether the change in the product configuration, as a result of processing the test case in accordance with the at least one rule, produced a configuration error in the product configuration; and generating explanation data with the computer system to provide an explanation of any detected configuration error in the product configuration.

2. The method, as set forth in claim 1, wherein processing the test case, further includes:

initializing the computer system with a part state;

inputting at least one part selection to change the product configuration; and listening to state change events in the system to detect when a state change event occurs that results in the computer system being in the initialized part state.

3. The method, as set forth in claim 2, wherein generating explanation data, further includes:

generating explanation data that explains the part state in terms of the state change event.

4. The method, as set forth in claim 3, wherein processing the test case, further includes:

generating a new part state for each part associated with the chance in the product configuration.

5. The method, as set forth in claim 4 wherein processing the test case further includes:

determining causes that explain the new part states in terms of the state change event.

6. The method, as set forth in claim 5 wherein generating explanation data further comprises:

generating a cause tree wherein the root of the cause tree is the initial part state and leaves of the tree are the user's selections of parts.

7. The method, as set forth in claim 6 wherein generating explanation data comprises further comprises:

generating an explanation of the part state wherein the part selections are the root of the explanation data and the causes follow from the part selections.

8. The method, as set forth in claim 7, further comprising:

sorting the tree by iteration number, wherein the iteration number of a part state is determined by measuring the longest distance between the part state and the cause corresponding to the part state.

9. The method, as set forth in claim 1, wherein the explanation data is based on selection of a part.

10. The method, as set forth in claim 1, wherein the explanation data is based on execution of a rule.

11. The method, as set forth in claim 1, wherein the explanation data is based on a part being in two states at the same time.

12. The method, as set forth in claim 1, wherein the explanation data is based on a requires choice rule that cannot be satisfied.

13. The method, as set forth in claim 1, wherein the explanation data is based on a look ahead process.

14. The method as set forth in claim 1 wherein the test case further comprises data to:

select a product;

select at least one part; and generate a part state of the selected part based on one or more rules.

15. The method as set forth in claim 14, further comprising:

determining whether the product is selectable.

16. The method as set forth in claim 14, further comprising:

reporting the state of the product as not selectable when selection of the product would conflict with the rule.

17. The method as set forth in claim 14, further comprising:

determining sets of parts that are excluded or deleted based on the product.

18. The method as set forth in claim 14, further comprising:

detecting when a state change event occurs that results in the computer system being in the initialized part state.

19. The method, as set forth in claim 1, wherein the test case further includes data to select at least one part to include in the product configuration and processing test case further comprises:

processing the at least one rule to determine whether the at least one part selected in the test case conflicts with the plurality of parts previously included in the product configuration.

20. A computer program product having code embodiment therein to cause a processor to test a product configuration for configuration errors, wherein the product configuration is stored as electronic data in a computer system, the computer system including at least one rule defining a relationship between at least two parts, the product configuration including a plurality of parts, the code comprising:

computer readable program code configured to cause the computer system to allow a user to enter a test case into the computer system to detect configuration errors in the product configuration, wherein the test case includes data to change the product configuration;

computer readable program code configured to cause the computer system to process the test case with the computer system in accordance with the at least one rule to detect whether the change in the product configuration, as a result of processing the test case in accordance with the at least one rule, produced a configuration error; and computer readable program code configured to cause the computer system to generate explanation data with the computer system to provide an explanation of any detected configuration error in the product configuration.

21. The article of manufacture, as set forth in claim 20, further including:

computer readable program code configured to cause the computer system to initialize the computer system with a part state;

computer readable program code configured to cause the computer system to input at least one part selection to change the product configuration; and computer readable program code configured to cause the computer system to listen to state change events in the system to detect when a state change event occurs that results in the system being in the initialized part state.

22. The article of manufacture, as set forth in claim 21, further including:

computer readable program code configured to cause the computer system to generate explanation data that explains the part state in terms of the state change event.

23. The article of manufacture, as set forth in claim 22, further including:

computer readable program code configured to cause the computer system to generate a new part state for each part associated with the change in the product configuration.

24. The article of manufacture, as set forth in claim 23, further including:

computer readable program code configured to cause the computer system to determine causes that explain the new part states in terms of the state change event.

25. The article of manufacture, as set forth in claim 24, further comprising:

computer readable program code configured to cause the computer system to generate a cause tree wherein the root of the cause tree is the initial part state, and leaves of the tree are the user's selections of parts.

26. The article of manufacture, as set forth in claim 25, further comprising:

computer readable program code configured to cause the computer system to generate an explanation of the part state wherein the part selections are the root of the explanation and the causes follow from the part selections.

27. The article of manufacture, as set forth in claim 26, further comprising:

computer readable program code configured to cause the computer system to sort the tree by iteration number, wherein the iteration number of a part state is determined by measuring the longest distance between the part state and the cause corresponding to the part state.

28. The article of manufacture, as set forth in claim 20, wherein the explanation data is based on selection of a part.

29. The article of manufacture, as set forth in claim 20, wherein the explanation data is based on execution of a rule.

30. The article of manufacture, as set forth in claim 20, wherein the explanation data is based on a part being in two states at the same time.

31. The article of manufacture, as set forth in claim 20, wherein the explanation data is based on a requires a choice rule that cannot be satisfied.

32. The article of manufacture, as set forth in claim 20, wherein the explanation data is based on a look ahead process.

33. The computer program product, as set forth in claim 20, wherein the test case further includes data to select at least one part to include in the product configuration and the computer readable program code configured to cause the computer system to process the test case further comprises:

computer readable code to process the at least one rule to determine whether the at least one part selected in the test case conflicts with the plurality of parts previously included in the product configuration.

34. An apparatus for testing a product configuration for configuration errors generated by a product configuration system, comprising:

a memory having stored therein at least one rule defining a relationship between at least two parts in the product configuration;

a test case to detect configuration errors in the product configuration, wherein the test case includes data to change the product configuration; and a processor coupled to the memory to (a) process the at least one rule and the test case, (b) detect whether the change in the product configuration, as a result of processing the test case in accordance with the at least one rule, produced a configuration error and (c) generate explanation data to provide an explanation of any detected configuration error in the product configuration.

35. The apparatus, as set forth in claim 24, wherein the processor is further operable to:

initialize the configuration system with a part state;

to input the at least one part selection to change the product configuration;

to listen to state change events in the system; and to detect when a state change event occurs that results in the configuration system being in the initialized part state.

36. The apparatus, as set forth in claim 35, wherein the processor is further operable to:

generate explanation data that explains the part state in terms of the state change event.

37. The apparatus, as set forth in claim 36, wherein the processor is further operable to:

generate a new part state for each part associated with the change in the product configuration.

38. The apparatus, as set forth in claim 37, wherein the processor is further operable to:

generate a cause tree wherein the root of the cause tree is the initial part state, and leaves of the tree are the user's selections of parts.

39. The apparatus, as set forth in claim 37, wherein the processor is further operable to:

generate an explanation of the part state wherein the part selections are the root of the explanation and the causes follow from the part selections.

40. The apparatus, as set forth in claim 37, wherein the processor is further operable to:

sort the tree by iteration number, wherein the iteration number of a part state is determined by measuring the longest distance between the part state and the cause corresponding to the part state.

41. The apparatus, as set forth in claim 34, wherein the explanation data is based on execution of a rule.

42. The apparatus, as set forth in claim 34, wherein the explanation data is based on a part being in two states at the same time.

43. The apparatus, as set forth in claim 34, wherein the explanation data is based on a requires a choice rule that cannot be satisfied.

44. The apparatus, as set forth in claim 34, wherein the explanation data is based on a look ahead process.

45. The apparatus as set forth in claim 34, wherein the test case further includes a product selection.

46. The apparatus as set forth in claim 34 wherein the product configuration comprises at least one vector, wherein said vector comprises a bit field, further wherein the bit field comprises bits that represent elements in a configuration.

47. The apparatus as set forth in claim 46, wherein the number of bits in the bit field is equal to the total number of elements and an element's bit can be set or reset to specify that state of the element in the configuration.

48. The apparatus as set forth in claim 46, wherein the vector specifies whether an element has been selected by the user during the configuration.

49. The apparatus as set forth in claim 46, wherein excluded vectors identify whether an element is excluded from a configuration.

50. The apparatus as set forth in claim 46, wherein removed vectors identify whether an element is removed from a configuration.

51. The apparatus as set forth in claim 46, wherein the vector identifies whether an element is selectable.

52. The apparatus as set forth in claim 46 further comprising:

a database having at least one table, wherein said table represents relationships between elements in a configuration and having at least one modified rule, wherein the rule is modified based on results of testing a product selection.

53. The apparatus as set forth in claim 52, wherein said table represents "includes" relationships between elements in a configuration.

54. The apparatus as set forth in claim 52, wherein said table represents "excludes" relationships between elements in a configuration.

55. The apparatus as set forth in claim 52, wherein said table represents "removes" relationships between elements in a configuration.

56. The apparatus as set forth in claim 52, wherein said table represents "requires choice" relationships between elements in a configuration.

57. The apparatus as set forth in claim 56, wherein the representation of "requires choice" relationships includes a pointer to a group table that includes a bit vector that identifies the elements that are contained in the group from which a choice is to be made.

58. The apparatus as set forth in claim 56, wherein the representation of "requires choice" relationships includes minimum and maximum designations to identify the minimum and maximum number of group members that are to be selected to satisfy the "requires choice" relationship.

59. The apparatus as set forth in claim 52, wherein said table includes a left-hand side and a right-hand side.

60. The apparatus as set forth in claim 59, wherein the left-hand side includes a bit vector that contains bits corresponding to elements.

61. The apparatus as set forth in claim 59, wherein the right-hand side includes one or more bit vectors that represent configuration elements.

62. The apparatus as set forth in claim 34 wherein the test case further comprises data representing:

a product selection;

at least one part selection; and an expected state of the selected part based on one or more rules.

63. The apparatus, as set forth in claim 34, wherein the test case further pertains to including at least one part in the product configuration and the processor is further operable to:

determine whether the at least one part in the test case conflicts with the plurality of parts previously included in the product configuration according to the at least one rule.

64. An apparatus for testing a product configuration for configuration errors generated by a computer implemented product configuration system, comprising:

means for defining a relationship between at least two parts in the product configuration;

means for defining a test case to detect configuration errors in the product configuration, wherein the test case includes data to change the product configuration;

means for processing the test case with the product configuration system in accordance with the at least one rule to detect whether the chance in the product configuration, as a result of processing the test case in accordance with the relationship between at least two parts in the product configuration, produced a configuration error in the product configuration; and means for generating explanation data with the product configuration system to provide an explanation of any detected configuration error in the product configuration.

65. The apparatus, as set forth in claim 64, further comprising:

means for initializing the configuration system with a part state;

means for detecting a state change event in the configuration system; and means for detecting when a state change event occurs that results in the configuration system being in the initialized part state.

66. The apparatus, as set forth in claim 65, further comprising:

means for generating a cause that explains the part state in terms of the state change event.

67. The apparatus, as set forth in claim 66, further comprising:

means for generating a new part state for each part associated with the cause.

68. The apparatus, as set forth in claim 67, further comprising:

means for generating a cause tree, wherein the root of the cause tree is the initial part state, and leaves of the tree are the user's selections of parts.

69. The apparatus, as set forth in claim 67, further comprising:

means for generating an explanation of the part state, wherein the part selections are the root of the explanation and the causes follow from the part selections.

70. The apparatus, as set forth in claim 64, further comprising:

means for modifying the at least one rule when the test case conflicts with the plurality of parts previously included in the product configuration.

71. The apparatus, as set forth in claim 64, wherein the test case is further defined to include at least one part in the product configuration and the means for processing the test case includes:

means for determining whether the at least one part in the test case conflicts with the plurality of parts previously included in the product configuration according to the at least one rule.

* * * * *